United States Patent [19]

Doki et al.

[11] Patent Number: 4,580,211
[45] Date of Patent: Apr. 1, 1986

[54] METHOD FOR CONTROLLING STORAGE OF DATA SETS IN MEMORY UNIT

[75] Inventors: Mitsuru Doki, Tokyo; Takayasu Yamakawa, Yokohama, both of Japan

[73] Assignee: Hitachi, Ltd., Tokyo, Japan

[21] Appl. No.: 577,810

[22] Filed: Feb. 7, 1984

[30] Foreign Application Priority Data

Feb. 9, 1983 [JP] Japan .................................. 58-18816

[51] Int. Cl.⁴ ............................................. G06F 13/00
[52] U.S. Cl. .................................................... 364/200
[58] Field of Search ... 364/200 MS File, 900 MS File, 364/300; 360/48, 50

[56] References Cited

U.S. PATENT DOCUMENTS 4,467,421  8/1984  White .................................. 364/200

Primary Examiner—Raulfe B. Zache
Attorney, Agent, or Firm—Antonelli, Terry & Wands

[57] ABSTRACT

In a computer system, there is provided the information representing empty areas generated when data sets are stored in a magnetic disk apparatus. From that information, the total capacity of empty areas and the deree of nonuniformity in size of empty areas are derived. If the result indicates that a sufficient effect is brought about by effecting recompilation processing of restoring the data sets by packing empty areas, the recompilation processing is carried out.

3 Claims, 8 Drawing Figures

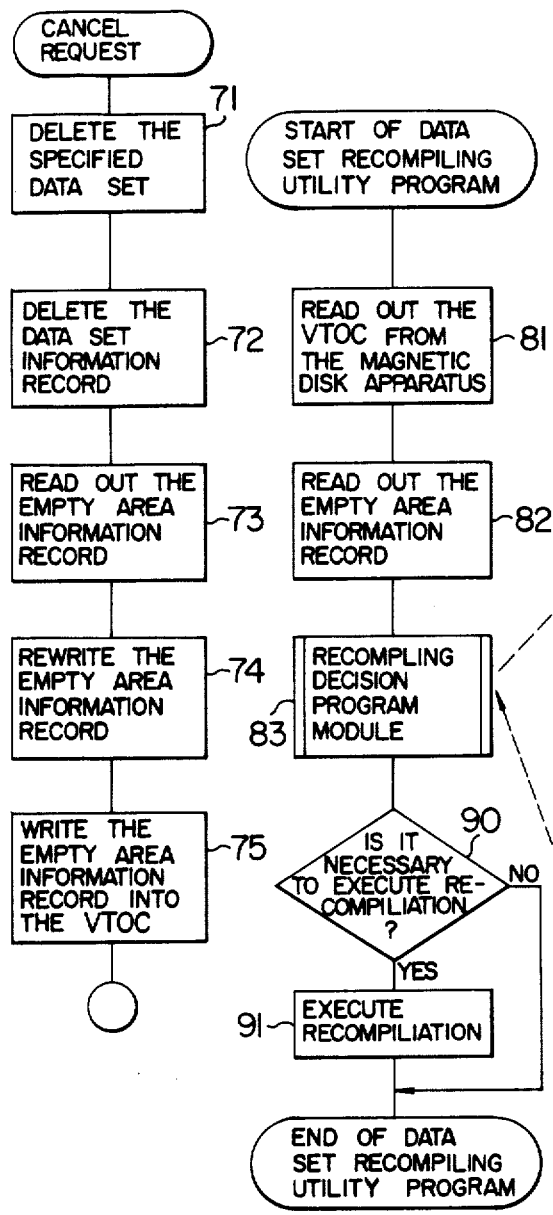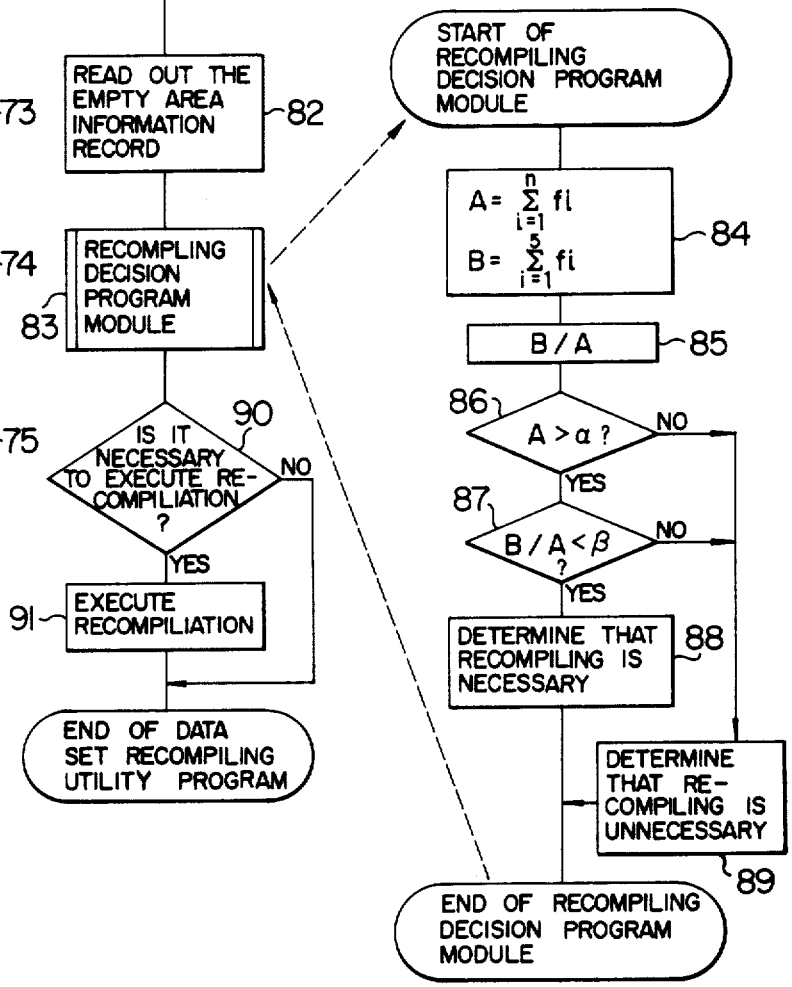
FIG. 7
FIG. 8

METHOD FOR CONTROLLING STORAGE OF DATA SETS IN MEMORY UNIT

The present invention relates to a method for recompiling data storage areas in a direct access memory unit such as a magnetic disk apparatus when empty areas are fragmentary.

In a direct access memory unit such as a magnetic disk unit which is connected to a host computer shared by a number of users and a number of data sets, memory areas for data sets are repetitively allocated and canceled. The term "data set" means a collection of data records. In this case, because of variation in the size of the data set and variation in the time during which the data set is retained in the memory unit, fragmentation of an empty area is often caused on the storage medium. That is to say, an empty area is often divided into a number of small areas. With the advance of such fragmentation of an empty area, even if the empty area has a sufficient total capacity, allocation of a storage area to a new data set becomes impossible because of incontinuity of fragments. When fragmentation of an empty area is incurred in a direct access memory unit, therefore, fragments of an empty area must be put together by relocating data sets stored on the memory unit.

Conventional processing for putting together fragments of an empty area will now be described. The VTOC (Volume Table Of Contents) which is stored on a particular area of a memory unit for indicating the storage states of data sets is printed out. Based upon the VTOC, the operator supposes that empty areas are fragmented or that they are not fragmented. When the operator supposes that empty areas are fragmented, the data set recompiling utility program of the host computer is run. Whether the empty areas are fragmented or not, the data set recompiling utility program uniformly executes recompilation processing. Thus, the utility program unconditionally relocates data sets on the storage medium to put together fragments of an empty area. Even if putting together fragments will be of no effect, therefore, the recompiling utility program might be executed. For example, even if empty areas are not so fragmented or putting together fragments will not produce a large empty area, the recompiling utility program might be executed. This results in a problem that the computer and the operator are involved in fruitless processing. It usually takes several tens of minutes to recompile one volume. For a magnetic disk apparatus, the term "one volume" refers to one disk pack. Since many volumes are usually handled, it takes a long processing time for recompilation.

Therefore, an object of the present invention is to suppress recompilation processing for storage areas having little effect.

In accordance with the present invention, when a plurality of data sets are stored in a magnetic disk volume, the information concerning empty areas is provided. Based on the information, it is determined whether recompilation processing for restoring data sets while filling empty areas is to be carried out or not. Following the determined result, the recompilation processing is performed.

The present invention will be apparent from the following detailed description taken in conjunction with the accompanying drawings, in which:

FIG. 7 is a flow chart of processing for canceling a data set; and

FIG. 8 is a flow chart of processing for recompiling data set storage in the magnetic disk apparatus.

In a computer system, a plurality of data sets used in processing to be executed are stored in an external memory unit such as a magnetic disk apparatus.

Figure 1:
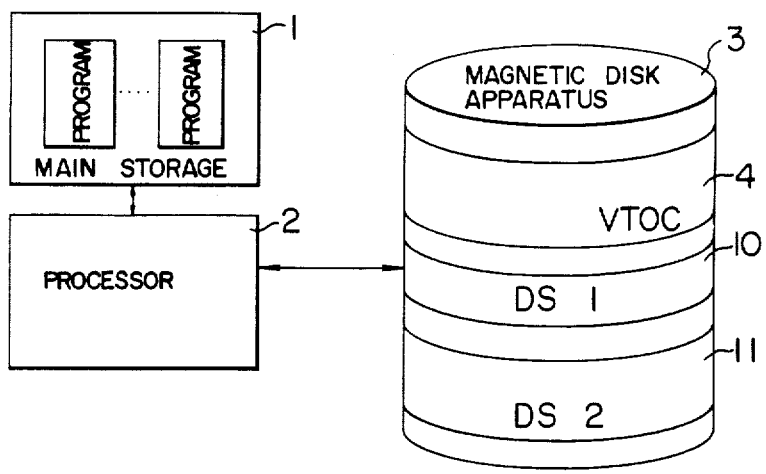
FIG. 1 shows the schematic configuration of an embodiment of the present invention.

In FIG. 1, numeral 1 denotes a main storage and numeral 2 denotes a processor. Numeral 3 denotes a magnetic disk apparatus. The processor 2 reads out the program stored in the main storage 1 to perform processing. At this time, the data required for that processing are read out of the magnetic disk apparatus 3 and stored in the main storage 1 to be used.

In the magnetic disk apparatus 3, the above described VTOC 4 and data sets (DS) are stored.

Figure 3:
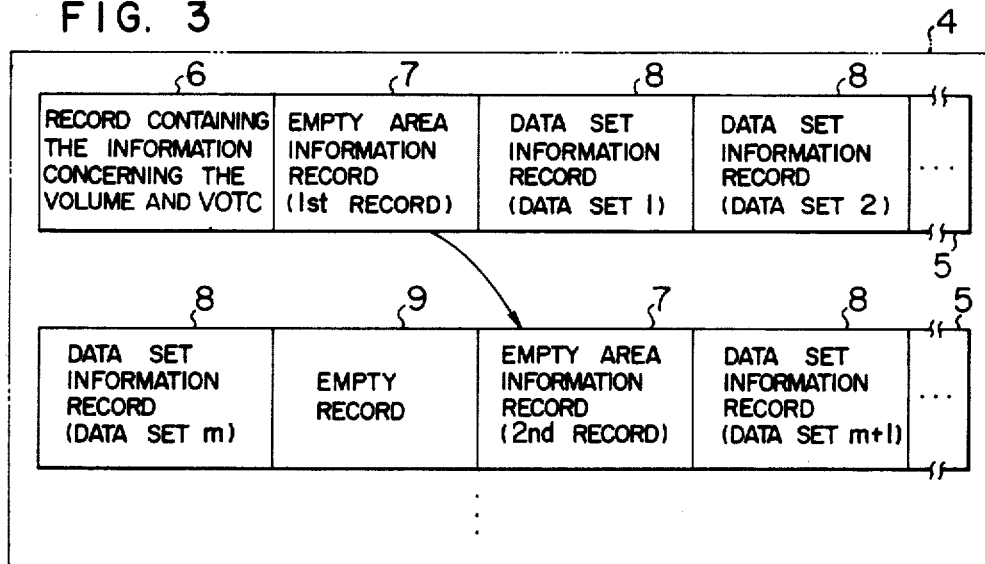
FIG. 3 shows details of the VTOC.
Figure 4:
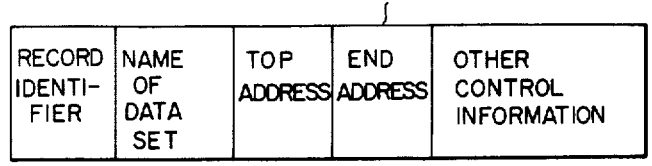
FIG. 4 shows details of a data set information record.

FIG. 3 shows details of the VTOC 4. The VTOC 4 is stored on a particular track 5 of each volume. The VTOC 4 comprises a record 6 containing the information concerning that volume and the VTOC themselves, an empty area information record 7, a data set information record 8, and an empty record 9. If there is not a data set stored, all of the records existing on the track 5 are empty records 9 excepting the record 6. When a data set is stored, a data set information record for that data set is written. As illustrated in FIG. 4, a data set information record comprises a record identifier for indicating whether the record is an empty area information record or a data set information record, the name of the stored data set, the top address of the area in which the data set is stored, the end address of that area, and other control information. The address is represented by a cylinder number and a track number.

Figure 5:
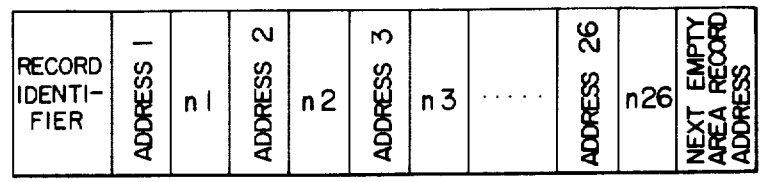
FIG. 5 shows details of an empty area information record.

Further, the empty area information record 7 is written. As illustrated in FIG. 5, the empty area information record 7 is composed of a record identifier, top addresses of empty areas and sizes of the empty areas. One record contains the information concerning up to 26 empty areas. If there are more than 26 empty areas, the information concerning excessive empty areas are recorded in another record. In case a plurality of empty records are used, the address of the next empty area record is recorded at the end of an empty area record.

Figure 6:
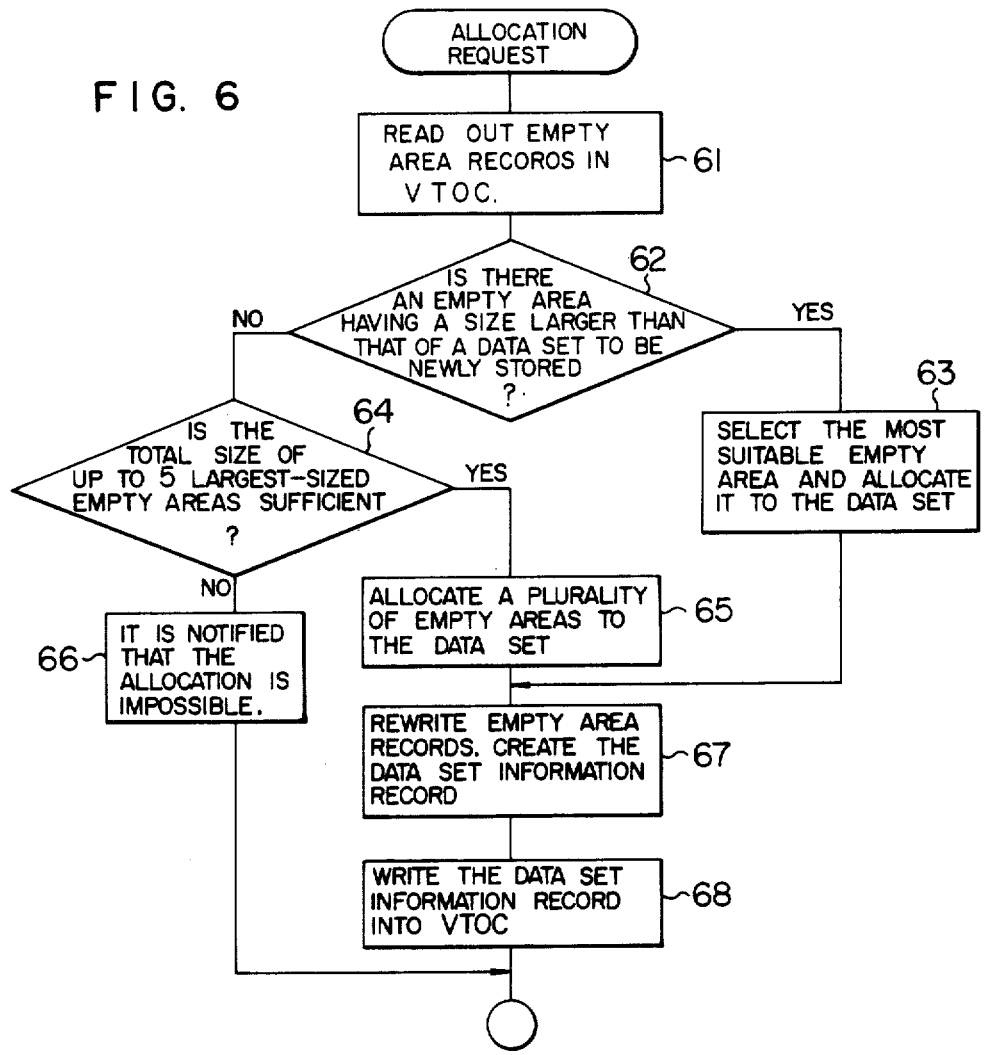
FIG. 6 is a flow chart of processing for alloting a storage area to a data set.

Before the outset of new processing, a request to allocate storage areas to data sets required for the processing is issued from a control program for managing the processing carried out in the computer system. The processor 2 then carries out the allocation processing in accordance with the allocation processing program. FIG. 6 shows the processing flow of the allocation processing program. At first, empty area information records contained in the VTOC 4 are read out of the magnetic disk unit 3 (61). At this time, the record identifier placed at the top of each record is checked. When a record identifier designating an empty area information record has been detected, that record is read out. Subsequently, it is examined whether or not there is an empty area having a size larger than the size (the number of tracks) of a data set to be newly stored (62). An empty area is represented by "f". Assume that capacities of empty areas may be represented as: $f_1=10$, $f_2=8$, $f_3=6$, $f_4=5$, $f_6=2$, $f_7=1$ and $f_8=1$ (tracks). If the size of the data set to be newly stored is 7 tracks, the empty area $f_2$ which is the minimum-sized empty area having more than 7 tracks is selected and allocated to the data set in concern (63).

To a data set having a size of 18 tracks, empty areas $f_1$ and $f_2$ are allocated (64, 65). For avoiding complicated control and further division of an empty area caused by allocating excessive number of areas to a data set, allocation is effected only when the data set can be divided to be stored in up to 5 largest-sized empty areas. When on the contrary allocation to a data set having a size of 34 tracks is requested in the above example, for instance, it is notified that the allocation is impossible (66). When allocation has been completed, empty area records are rewritten corresponding to the empty areas which have been newly generated and the empty areas which have disappeared (67). In addition, the data set information record concerning the new data set is produced. The data set information record thus produced is written in the VTOC (68). The data set is stored into empty areas thus allocated.

If a data set becomes unnecessary, the data set is canceled in accordance with the flow chart of the canceling program illustrated in FIG. 7. When a request for canceling a data set is issued from the control program, the data set stored in the magnetic disk apparatus is correspondingly deleted (71). Succeedingly, the data set information record concerning that data set is deleted from the VTOC 4. According to empty areas thus generated, the empty area information record is read out from the VTOC 4 (73) and the empty area information record is rewritten (74). And the empty area information record thus altered is written into the VTOC 4.

Figure 2:
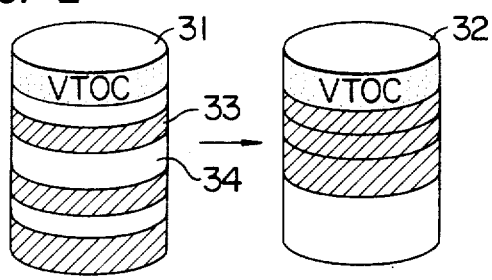
FIG. 2 shows an example of recompilation of data set storage.

During the use of the magnetic disk volume as represented by 31 in FIG. 2, the data set 33 is stored with many empty areas 34 interposed. Even if the total capacity of the empty areas is large enough to store a new data set, therefore, allocation of storage areas to the new data set may become difficult because of fragmented empty areas. Accordingly, the data set in the magnetic disk volume is restored to be packed. That is to say, the data set is recompiled.

This recompilation processing will now be described by referring to FIG. 8.

FIG. 8 shows processing flow charts of the data set recompiling utility program and the recompiling decision program module.

The data set recompiling utility program reads out the VTOC from a particular area on the magnetic disk volume (81), reads out an empty area information record as illustrated in FIG. 5 from that VTOC (82), and transfers the empty area information record thus read out to the recompiling decision program module (83). In the recompiling decision program module, based upon the empty area information record received, the total capacity A of all empty areas and the total capacity B of five largest-sized empty areas, for example, are respectively derived from the following expression (84)

$$A = \sum_{i=1}^{n} f_i \quad (1)$$

$$B = \sum_{i=1}^{5} f_{i'} \quad (2)$$

where $f_i$ is the size of an empty area, and n is the number of empty areas existing on the storage medium.

The ratio B/A is then computed (85).

The values A and A/B calculated in the steps 84 and 85 are compared with reference values $\alpha$ and $\beta$, respectively (86 and 87).

The reference values $\alpha$ and $\beta$ have been empirically obtained. If $A<\alpha$, the magnetic disk volume is fully utilized. If $A>\alpha$, there remain still sufficient empty areas to be utilized.

If $B/A>\beta$, empty areas concentrate upon five largest-sized empty areas. If $B/A<\beta$, empty areas are composed of a great number of fragments.

When $A<\alpha$ and when $B/A>\beta$, therefore, the data set is not recompiled (89).

Recompilation is not effected when $B/A>\beta$ because one data set may be divided to be stored into up to 5 empty areas in the method of this embodiment as described before.

If $A>\alpha$ and $B/A<\beta$, recompiling the data set is determined to be effective (88) and processing is returned to the module of the data set recompiling utility program. In the module, based upon the result of the above described processing, it is determined whether recompilation must be executed or not (90). If necessary, recompilation processing is then executed (91). This processing is performed by repeating operation of reading out data sets from the magnetic disk volume successively one track after another in the ascending order of address and successively writing the data sets into the beginning of empty areas.

As heretofore described, states of empty areas are examined. And only when it has been determined that recompiling storage states of data sets will yield a sufficient effect, data sets are recompiled to be stored again. Recompilation processing yielding little effect is not carried out. As a result, the computer system may be effectively used.

Although in the above example one data set may be divided to be stored into up to 5 empty areas, it is a matter of course that the number is not restricted to 5.

We claim:

1. A method for controlling storage of data sets in a computer system having a plurality of data sets stored in a magnetic disk apparatus comprising the steps of:
    (a) recording in said magnetic disk apparatus empty area information record for indicating a plurality of empty areas generated by storing the data sets into said magnetic disk apparatus;
    (b) reading out said empty area information record to examine states of empty areas; and
    (c) executing processing for restoring, in accordance with said states of empty areas, said data sets stored in said magnetic disk apparatus.

2. A method for controlling storage of data sets according to claim 1, wherein said empty area information record represents the location and the size of each of the empty areas, and wherein said reading step (b) comprises examining the total size of said empty areas and the degree of nonuniformity in size of empty areas, said step (c) comprises executing said processing when said total size exceeds a predetermined value and said degree of nonuniformity is smaller than another predetermined value.

3. A method for controlling storage of data sets according to claim 2, wherein said step (b) comprieses representing said degree of nonuniformity by the ratio of the total size of a predetermined number of largest-sized empty areas to the total size of all empty areas.

* * * * *